United States Patent [19]

Hara

[11] Patent Number: 4,488,409
[45] Date of Patent: Dec. 18, 1984

[54] TROUBLE DIAGNOSING APPARATUS FOR AN AUTOMOBILE AIR CONDITIONER

[75] Inventor: Toshizo Hara, Konan, Japan

[73] Assignee: Diesel Kiki Co., Ltd., Tokyo, Japan

[21] Appl. No.: 527,735

[22] Filed: Aug. 30, 1983

[30] Foreign Application Priority Data

Sep. 11, 1982 [JP] Japan ................................. 57-158540

[51] Int. Cl.³ ............................................. F25B 49/00
[52] U.S. Cl. ........................................ 62/127; 236/94
[58] Field of Search .................. 165/11 R; 236/94; 62/126, 127; 324/417

[56] References Cited

U.S. PATENT DOCUMENTS 3,480,833 11/1969 Allen ................................ 324/417 X
3,628,346 12/1971 Lagrone ................................ 62/126

Primary Examiner—William E. Wayner
Attorney, Agent, or Firm—Wenderoth, Lind & Ponack

[57] ABSTRACT

An apparatus for detecting a trouble condition of an air conditioner of an automobile automatically and displaying it as change of air distribution condition is equipped with a trouble detecting circuit for diagnosing the area of a trouble and for outputting a trouble signal therefrom. A drive control means is provided for operating an intake changeover device or a mode changeover device using the trouble signal from the trouble detecting circuit so as to indicate the diagnosed trouble area by controlling the air distribution.

5 Claims, 6 Drawing Figures

1

TROUBLE DIAGNOSING APPARATUS FOR AN AUTOMOBILE AIR CONDITIONER

BACKGROUND OF THE INVENTION

The present invention relates to an apparatus for diagnosing a trouble condition of an air conditioner of an automobile and more particularly to an apparatus for determining the trouble location of the air conditioner of an automobile having an automatic control function by the change of its air distribution condition.

The recent type of air conditioner for an automobile having an automatic control function has an increased number of input sensors or control drive units for achieving high performance. Also, since temperature, moisture, vibration and the like which are operating conditions of the air conditioner are severe, troubles occur frequently. However, in the prior art, no appropriate air conditioner diagnosing apparatus for diagnosing such troubles has been developed, and therefore, manually measuring voltages and the like by using a tester to check individually each location of troubles subject to diagnosis has been required, and it has been difficult to discover a location where a trouble occurs.

SUMMARY OF THE INVENTION

It is an object of this invention to provide an apparatus capable of discovering easily a location where a trouble occurs.

It is another object of this invention to provide an apparatus that does not require an exclusive display device for displaying the trouble location, and also such apparatus does not require an extra space for installation of such a device by displaying the trouble location by converting it to the change of the air distribution condition of the air conditioner of an automobile.

The gist of this invention resides in the trouble diagnosing apparatus for air conditioner of an automobile comprising an intake changeover device for selecting introduced air on the basis of an electrical signal of a trouble from a trouble detecting circuit that detects a trouble of a trouble diagnosing area as an electrical signal and a drive control means for transmitting a drive signal to at least one of the intake changeover device and a mode changeover device for selecting an air exit for blowing the introduced air into the inside of an automobile. Accordingly, when a trouble occurs in the trouble diagnosing area, at least one of the intake changeover device or the mode changeover device is moved and the air distributing condition in the air conditioner of an automobile is changed so that the trouble of the trouble diagnosing area is replaced by the change of the air distribution condition and the resulting change is recognized and because of this, the object can be accomplished.

DESCRIPTION OF THE PREFERRED EMBODIMENTS

Referring to the accompanying drawings, the preferred embodiments of the trouble diagnosing apparatus for an air conditioner of an automobile in accordance with the present invention will be explained in detail.

Figure 1:
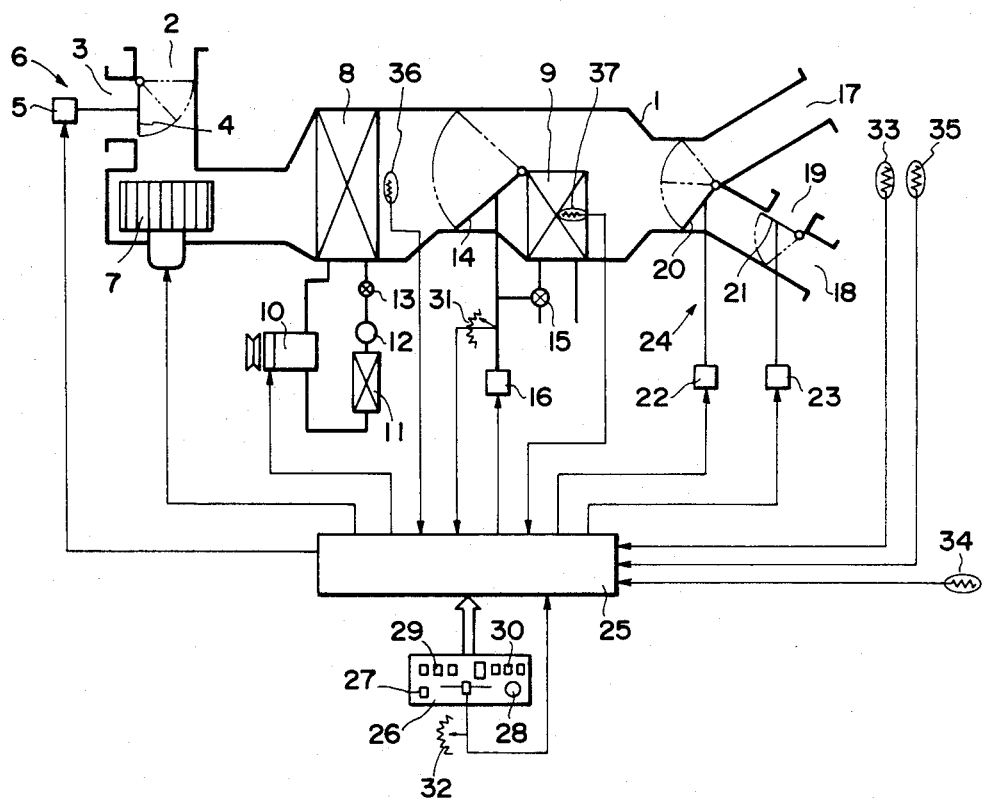
FIG. 1 is a schematic view of an entire air conditioner of an automobile which is an embodiment of this invention.

FIG. 1 shows a construction of the entire air conditioner of an automobile, in which an intake changeover device 6 is constructed in such way that an inside air inlet 2 and an atmospheric air inlet 3 are formed in a bifurcated configuration on an uppermost point of the air conditioning case 1, and an intake door 4 is provided at the portion from which the inlets 2 and 3 are formed, and the intake door 4 is operated by an actuator 5. This intake changeover device 6 is constructed in such way that, for example, the intake door 4 is changed over to three positions, namely, a position (Recirculation: Rec) where the inside air inlet 2 only is opened, to a position (Fresh: Fre) where the atmospheric air inlet 3 only is opened, and to a position (Mix: Mix) where the inside air inlet 2 and the atmospheric air inlet 3 are each half opened to select the introduced air.

A blower 7 is provided for blowing the air to the rear flow side after sucking the air into the air conditioning case 1, and is provided with an evaporator 8 and a heater core 9 at the rear flow side of the blower 7.

The evaporator 8 is provided for evaporating the coolant circulating in a cooling cycle consisting of the evaporator 8, compressor 10, condenser 11, liquid tank 12 and expansion valve 13 to cool the introduced air. On the other hand, the heater core 9 is provided for circulating the cooling water of the engine and heating the introduced air.

In the front part of the heater core 9, an air admix door 14 is provided. This air admix door 14 is to adjust a proportion of amount of the air passing the heater core 9 and the non-passing air according to its position, and is interlocked with a water value 15 for adjusting the flowrate of hot water to the heater core 9 and is operated by an actuator 16.

The rear flow side of the air conditioning case 1 is divided into an upper air exit 17, lower air exit 18 and defrost air exit 19 and those exits are opened to the interior of an automobile, and a mode changeover device 24 is constructed in such way that mode doors 20 and 21 are provided at the divided portion and the mode doors 20 and 21 are operated by actuators 22 and 23. This mode changeover device 24 is changed over to four positions, for example, to a position (Face mode: Face) where the mode doors 22 and 23 only are opened to the upper air exit 17, to a position (Bilevel mode: BI-L) where the upper air exit 17 and lower air exit 18 are opened, to a position (Foot mode: Foot) where the lower air exit 18 only is opened and to a position (Defrost mode: Def) where the defrost air exit 19 only is opened, and each air exit 17–19 for blowing the introduced air into the room can be selected.

A control circuit 25 is provided to control at least one of the intake changeover device 6 or the mode changeover device 24, and in this embodiment, the control circuit 25 controls both the intake changeover device 6 and the mode changeover device 24, and furthermore controls and the actuator 16 that moves the air admix door 14. To this control circuit 25, for example, 7 kinds of analog signals are inputted in addition to switch input signals from an air conditioner switch 27, fan switch 28, intake switch 29 and mode switch 30 of an operating unit 26. Namely, a potentiometer 31 for detecting a position of the air admix door 14, a temperature setter 32 for setting the temperature of the car interior and which is provided on the operating unit 26, a room sensor 33 for detecting the temperature of the car interior, an atmospheric sensor 34 for detecting atmospheric temperature external to the car, a sun ray sensor 3 35 for detecting amount of sun rays, a duct sensor 36 for detecting the air temperature immediately after its passage through the evaporator 8, and a water temperature sensor 37 for detecting the temperature of water flowing in the heater core 9 are connected to the control circuit 25 by means of connectors or wire harnesses and the like, and during normal control time, operation, comparison and amplification are carried out in the control circuit 25 by using the switch input signals and the analog signals, and the control of the air conditioner mentioned in the foregoing is appropriately controlled.

Figure 2:
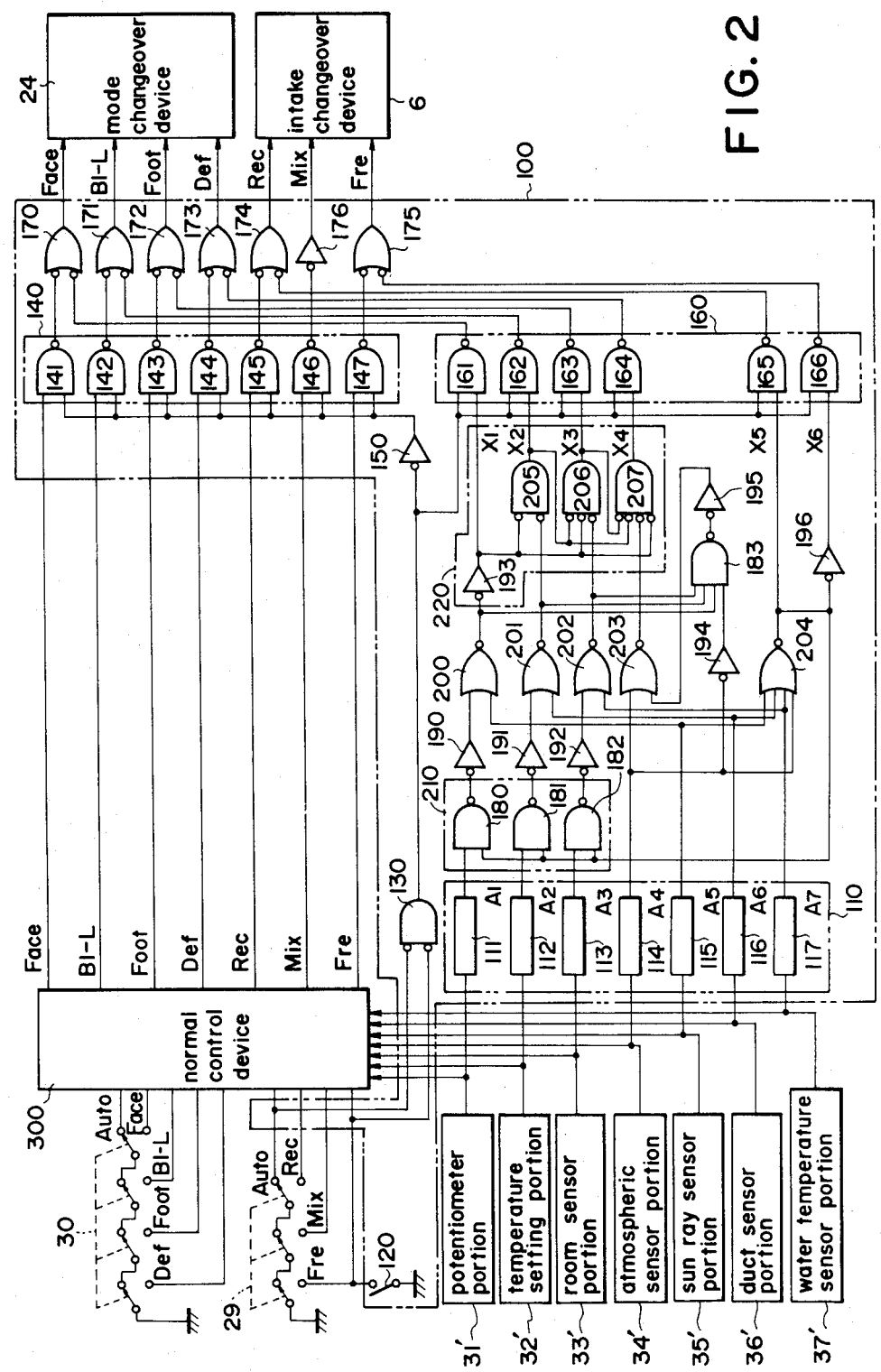
FIG. 2 is a circuit diagram of the trouble diagnosing apparatus.

FIG. 2 shows a concrete embodiment of the construction of a circuit of a trouble diagnosing apparatus 100 according to this invention, and the trouble diagnosing apparatus 100 is indicated by a portion surrounded by two-dot chained line, and the trouble diagnosing apparatus 100 is constructed in such way that the control circuit 25 is added to the prior art normal control unit 300 that performs the controlling of the normal control time mentioned above.

Trouble diagnosing areas 31'-37' of the trouble diagnosing apparatus 100 are, in this embodiment, portions including the potentiometer 31, temperature setter 32, room sensor 33, atmosphere sensor 34, sun ray sensor 35, duct sensor 36, water temperature sensor 37 proper and the connectors or wire harness portions, and they are respectively indicated at the potentiometer portion 31', temperature setter portion 32', room sensor portion 33', atmospheric sensor portion 34', sun ray sensor portion 35', duct sensor portion 36' and water temperature sensor portion 37'. The trouble diagnosing areas 31'-37' are connected to the trouble detecting circuit 110, and this trouble detecting circuit 110 is provided with the prior art wind comparators 111-117 in correspondence to the trouble diagnosing areas 31'-37'.

Figure 3:
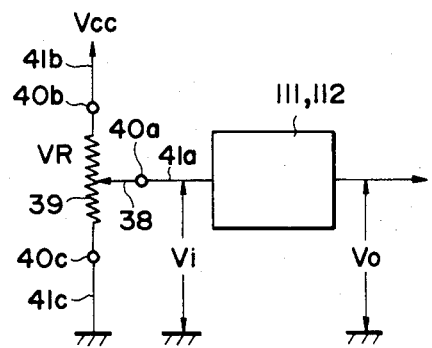
FIG. 3 is a wiring diagram of a trouble diagnosing area having a variable resistor and a wind comparator used in FIG. 2.
Figure 4:
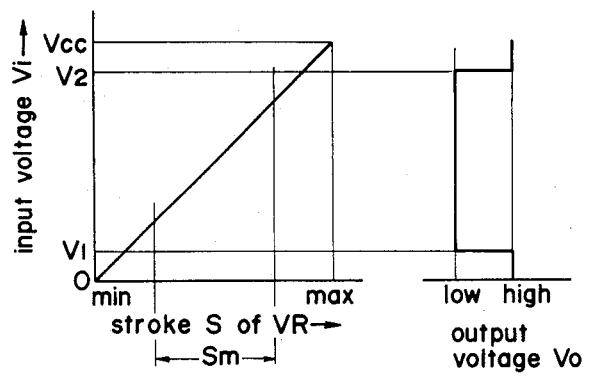
FIG. 4 is a characteristic diagram of the wind comparator used in FIG. 3.
Figure 5:
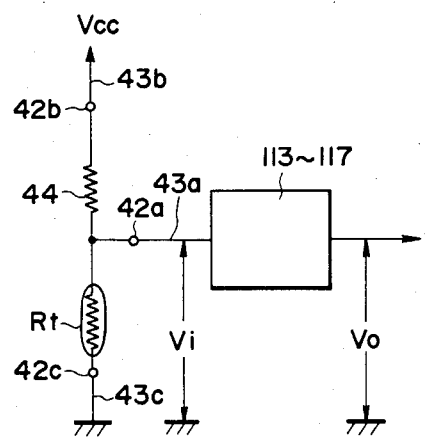
FIG. 5 is a wiring diagram of a trouble diagnosing area having a thermistor and comparator and the wind comparator.
Figure 6:
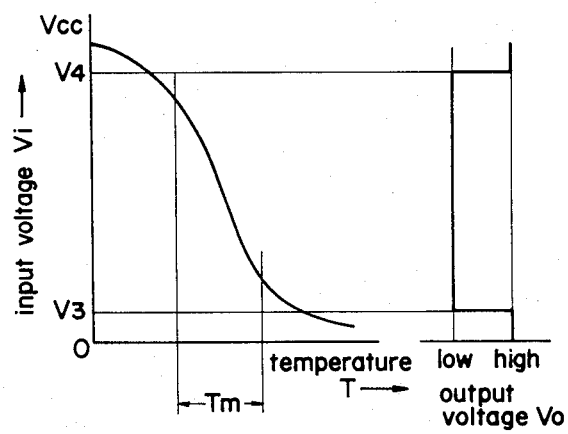
FIG. 6 is a characteristic diagram of the wind comparator used in FIG. 5.

The wiring of the trouble diagnosing areas 31'-37' and the wind comparators 111-117 is of such a construction as shown in FIG. 3 that in case the trouble diagnosing areas 31'-37' are provided with a variable resistor VR consisting of a movable contact 38 and a resistor 39, namely, in case it is the potentiometer 31' or the temperature setter 32', the movable contact 38 is connected to an input terminal of the wind comparator 111 or 112 by means of a connecting terminal 40a and a wiring 41a such as the wire harness. One terminal of a resistor 39 is connected to a power source Vcc by means of a connecting terminal 40b and a wiring 41b, and the other terminal of the resistor 39 is grounded by means of a connecting terminal 40c and a wiring 41c. The wind comparator 111 or 112 has characteristics that as shown in FIG. 4, in case a stroke S of a variable resistor VR exceeds a stroke range Sm to be normally used by a fixed value, corresponding voltage values V1, V2 are made as reference voltage, and in case an input voltage Vi is within the voltage values V1 and V2, an output voltage Vo becomes inversely a high level. Accordingly, when either an inferior connection or a disconnection occurs at least a portion of the wiring 41b, resistor 39, movable contact 38, connecting terminal 40a or wiring 41a, the input voltage Vi becomes below the voltage value V1, and also, when an inferior connection or a disconnection occurs in the connecting terminal 40c or the wiring 41c, the input voltage Vi becomes above the voltage value V2, and furthermore, when the wiring 41a is short circuited to the car body, the input voltage Vi becomes 0 so that in case a trouble occurs in any of the foregoing locations, the output voltage Vo becomes a high level whereby the trouble can be detected as the logical signal "1". Also, in case the trouble diagnosing areas 31'-37' have a thermistor Rt, namely, they are the room sensor portion 33', the atmospheric sensor portion 34', the sun ray sensor portion 36' or water temperature sensor portion 34', one terminal of the thermistor Rt is connected to a connecting terminal 42a, input terminals of the wind input terminals of the wind comparators 113-117 by means of a wiring 43a, and a stationary resistor 44, connecting terminal 42b and the power source Vcc by means of a wiring 43b, the other terminal of the thermistor Rt is grounded by means of the connecting terminal 42c and wiring 43c as shown in FIG. 5. The wind comparators 113-117 have characteristics such as that shown in FIG. 6, when the temperature T detected by the thermistor Rt exceeds the temperature range Tm (for example, $-50°$ C.$-120°$ C.) by a fixed value, the corresponding voltages V3 and V4 are made as the reference voltage, and when the input voltage Vi is within the voltage values V3 and V4, the output voltage Vo becomes a low level, and when exceeding the voltage values V3 and V4, the output voltage Vo becomes a high level inversely, and similar to the case where the variable resistor VR is provided, the trouble can be detected as the logical signal "1".

Consequently, according to this embodiment, in the trouble detecting circuit 110, not only proper portions of the trouble diagnosing areas 31'-37' but the trouble of the portion of the connector or wire harness can be simultaneously detected. By the way, in this embodiment, although the trouble diagnosing areas 31'-37' are formed as only the input portions, they are not limited thereto, and as another embodiment, for example, when the trouble is diagnosed in case a stop signal is not fed back in spite of the transmission of a drive signal for a fixed time to the actuator 16 for moving the air admix door 14, and it is also possible to make the control drive unit an area of the diagnosis of trouble, and the input of the trouble detecting circuit 110 may not only be an analog signal but may also be an ON-OFF signal.

The signal detected in the trouble detecting circuit 110 is processed for arithmetic operation by means of a drive control means to be explained hereinafter, and the drive signal is transmitted to at least one of the intake changeover device 6 or the mode changeover device 24.

The drive control means, in this embodiment, is formed by a logical circuit group, and is provided with a trouble diagnosing switch 120 capable of performing the trouble diagnosis. This trouble diagnosing switch 120 is, for example, connected to the Fre terminal of the intake switch 29, and the other terminal is grounded. Since the construction is provided in which the intake switch 29 is unable to connect both the Auto terminal and Fre terminal, a NOR circuit 130 has the Auto terminal and the Fre terminal connected to the input terminal such that a logical signal "1" is transmitted when the intake switch 29 is turned to Auto and the trouble diagnosing switch 120 is turned ON. As described in the foregoing, the trouble diagnosing switch 120 is not connected to both but as long as it is connected to one terminal selectively, the object can be achieved so that not only the other terminal of the intake switch 29 but also the terminal of the mode switch 30 may be used.

The output terminal of the NOR circuit 130 is connected through an inverter 150 to one input terminal of each NAND circuit 141–147 of a NAND circuit group 140 in which the signal from the normal control unit 300 are respectively fed to the other inputs thereof, and is connected to the other input terminal of each NAND circuit 161–166 of a NAND circuit group 160 in which the signal from the trouble detecting circuit 110 are respectively fed to the other inputs thereof. Accordingly, at the time of normal control when the trouble discriminating switch 120 is OFF, a logical signal "1" is inputted to one input terminal of each NAND circuit 141–147 of the NAND circuit group 140 at the normal control unit 300 side, and a logical signal "0" is inputted to the one input terminal of each NAND circuit 161–166 of NAND circuit group 160 at the trouble detecting circuit 110 so that the output from the normal control unit 300 becomes effective, and the intake changeover device 6 and the mode changeover device 24 are controlled by means of NAND circuits 170–175 of the output terminal and an inverter 176. Conversely, at the trouble diagnosing time when a trouble diagnosing switch 120 is turned ON, the logical signal "0" is inputted to one input terminal of each NAND circuit 141–147 of the NAND circuit group 140 at the normal control unit 300 side, and the logical signal "1" is inputted to the one input terminal of a NAND circuit group 160 at the trouble detecting circuit 110 side so that the output from the normal control unit 300 is blocked, and trouble signals A1–A7 from the trouble detecting circuit 110 become effective.

Such trouble signals A1–A7 are converted to signals X1–X6 by means of NAND circuits 180–183, inverters 190–196 and NOR circuits 200–207, and are inputted to the other input terminal of each NAND circuit 161–166 of the NAND circuit group 160. The NAND circuits 180–182 and inverter 193 and NOR circuits 205–207 constitute inhibiting circuits 210 and 220, and a priority order of the trouble signals A1–A7 is set so that more than two drive signals are not inputted to the mode changeover device 24 simultaneously. However, the signals X1–X6 are represented by the following:

$X1 = A1 \cdot \overline{A4} \cdot \overline{A5} \cdot \overline{A6} \cdot \overline{A7} + A5$ $X2 = \overline{X1} \cdot (A2 \cdot \overline{A4} \cdot \overline{A5} \cdot \overline{A6} \cdot \overline{A7} + A6)$ $X3 = \overline{X1} \cdot \overline{X2} (A3 \cdot \overline{A4} \cdot \overline{A5} \cdot \overline{A6} \cdot \overline{A7} + A7)$ $X4 = \overline{X1} \cdot \overline{X2} \cdot \overline{X3} \cdot B$ (provided that B denotes an output of NOR circuit 203)

$X5 = \overline{A4} \cdot \overline{A5} \cdot \overline{A6} \cdot \overline{A7}$ $X6 = = A4 \cdot A5 \cdot A6 \cdot A7.$ Accordingly, at the trouble diagnosing time when the trouble discriminating switch 120 is turned ON, the signals X1–X6 become the drive signals to the intake changeover device 6 and the mode changeover device 24 as they are so that the relationship of the trouble of the trouble diagnosing areas 31′–37′ and the air distribution condition of the air conditioner of an automobile is as shown in the following Table.

| Trouble diagnosing area | Intake changeover device | | Mode changeover device 24 | | | |
|---|---|---|---|---|---|---|
| | Rec | Fre | Def | Foot | Bl-L | Face |
| potentiometer portion 31′ | o | | | | | o |
| temperature setter portion 32′ | o | | | o | | |
| room sensor portion 33′ | o | | | o | | |
| atmospheric sensor portion 34′ | | o | o | | | |
| sun ray sensor portion 35′ | | o | | | | o |
| duct sensor portion 36′ | | o | | | o | |
| water temperature sensor portion 37′ | | o | | o | | |
| normal | o | | o | | | |

Namely, the foregoing operation will be explained by referring to FIG. 1, in which if the potentiometer portion 31′ is in trouble, the air introduced from the inside air inlet 2 is blown into the car interior through the upper air exit 17, and in case of the temperature setter portion 32′, the air is blown through the upper air exit 17 and the lower air exit 18 and in case of the room sensor portion 33′, the air is blown through the lower air exit 18 respectively, and in case the atmospheric sensor portion 34′ is in trouble, the air introduced through the atmospheric inlet 3 is blown into the room through the defrost air exit 19, and in case of the sun ray sensor portion 35′, the air is blown through the upper air exit 17, and in case of the duct sensor portion 36′, the air is blown through the upper air exit 17 and the lower air exit 18, and in case of the water temperature sensor portion 37′, the air is blown through the inside air inlet 2 respectively. In a normal case when no trouble occurs in any of the locations, the air introduced through the inside air inlet 2 is blown through the defrost air exit 19, and as the result, the trouble of the air conditioner of an automobile can be diagnosed from the foregoing.

By the way, the drive control means in the foregoing embodiment is constructed as a hard wired logic system, but as another embodiment, the program operation system may be constructed by using microcomputers and the like, and a concrete example thereof is easy to discern by those who are skilled in the art from the foregoing description so that an explanation thereof has been omitted.

As described in the foregoing, according to this invention, since the recognition of the trouble location of the air conditioner of an automobile is made by causing a change of the distribution condition of the air, it becomes possible to perform the trouble diagnosis of the air conditioner of an automobile. Also, since a exclusive display device for displaying the trouble is not needed, the apparatus becomes low cost and has an advantage in that there is no need for securing a special space for the installation thereof.

What is claimed is:

1. In an air conditioner for an automobile having an air distribution changeover means for electrically changing over a distribution condition of air passing through a duct means, and having an electric control means for electrically controlling the air conditioner of an automobile, a trouble diagnosing apparatus comprising:

trouble diagnosing areas located at a plurality of portions of said electric control means;

a plurality of trouble detecting circuits for detecting a trouble at said trouble diagnosing areas as an electrical trouble signal; and a drive control means for controlling said air distribution changeover means when said trouble signal is outputted from at least one of said trouble detecting circuit and causing it to be in a predetermined air distribution condition in correspondence with said trouble diagnosing area having a detected trouble.

2. A trouble diagnosing apparatus according to claim 1, wherein said air distribution changeover means is provided with an intake changeover device for selecting the flow of the air introduced into duct means, and wherein said changeover device comprises an inside air inlet, an atmospheric inlet, an intake door for opening and closing said inside air inlet or said atmospheric inlet, and an actuator for driving said intake door.

3. A trouble diagnosing apparatus accoding to claim 1, wherein said air distribution changeover means is provided with a mode changeover device for selecting the flow of air blown into an interior of said automobile from said duct means, and wherein said mode changeover device comprises a plurality of air exits opened to said interior, a plurality of mode doors for opening and closing said air exits, and at least one actuator for driving said mode doors.

4. A trouble diagnosing apparatus according to claim 1, wherein said trouble detecting circuit is provided with a wind comparator for reversing its output when an input voltage is inputted from one of said trouble diagnosing areas which corresponds to the case where it exceeds a predetermined range of values for said trouble diagnosing area by a fixed value.

5. A trouble diagnosing apparatus according to claim 1, wherein said drive control means is provided with a trouble diagnosing switch for causing said apparatus to perform a trouble diagnosis.

* * * * *